United States Patent
Trim et al.

(10) Patent No.: US 11,636,383 B2
(45) Date of Patent: Apr. 25, 2023

(54) DETECTING AND PREVENTING UNWANTED MODEL TRAINING DATA

(71) Applicant: International Business Machines Corporation, Armonk, NY (US)

(72) Inventors: Craig M. Trim, Ventura, CA (US); Gary Francis Diamanti, Wake Forest, NC (US); Aaron K. Baughman, Cary, NC (US); Mauro Marzorati, Lutz, FL (US)

(73) Assignee: International Business Machines Corporation, Armonk, NY (US)

( * ) Notice: Subject to any disclaimer, the term of this patent is extended or adjusted under 35 U.S.C. 154(b) by 801 days.

(21) Appl. No.: 16/558,720

(22) Filed: Sep. 3, 2019

(65) Prior Publication Data
US 2021/0064929 A1 Mar. 4, 2021

(51) Int. Cl.
*G06N 20/00* (2019.01)
*G06F 18/214* (2023.01)
*G06F 18/21* (2023.01)

(52) U.S. Cl.
CPC ......... *G06N 20/00* (2019.01); *G06F 18/2148* (2023.01); *G06F 18/2178* (2023.01); *G06F 18/2193* (2023.01)

(58) Field of Classification Search
CPC .. G06K 9/6257; G06K 9/6263; G06K 9/6265; G06K 9/6256; G06K 9/6268; G06N 20/00; G06N 7/005
USPC ......................................................... 706/12
See application file for complete search history.

(56) References Cited

U.S. PATENT DOCUMENTS

| | | |
|---|---|---|
| 6,765,864 B1 | 7/2004 | Natarajan et al. |
| 7,426,497 B2 | 9/2008 | Bacioiu et al. |
| 8,402,543 B1 | 3/2013 | Ranjan et al. |
| 8,424,091 B1 | 4/2013 | Su et al. |
| 9,275,291 B2 | 3/2016 | Shulman et al. |
| 9,717,607 B1 | 8/2017 | Bostick |
| 2012/0216257 A1* | 8/2012 | Steiner ................. G06Q 50/01 726/4 |
| 2015/0193695 A1 | 7/2015 | Mota et al. |

(Continued)

OTHER PUBLICATIONS

Peter C. Austin, "Balance diagnostics for comparing the distribution of baseline covariates between treatment groups in propensity-score matched samples", 2009, (Year: 2009).*

(Continued)

*Primary Examiner* — Stephen P Coleman
(74) *Attorney, Agent, or Firm* — Brian D. Welle

(57) ABSTRACT

A method and a system for dataset evaluation are provided. The method can include acquiring a new dataset for integration with an existing dataset. The existing dataset is used to train a machine learning model. The method can also include calculating a baseline of variation for the existing dataset. The baseline of variation can be determined by evaluating various characteristics of the existing dataset. The method can further include determining an output value for the new dataset by also evaluating characteristics of the new dataset. The method can also include comparing the output value to the baseline of variation to generate a variance between the output value and the baseline of variation. The method can further include determining whether the variance is within an acceptable range of the baseline of variation.

18 Claims, 5 Drawing Sheets

(56) References Cited

U.S. PATENT DOCUMENTS

2015/0193697 A1    7/2015   Vasseur et al.
2018/0060580 A1    3/2018   Zhao et al.
2018/0307899 A1   10/2018   Das et al.
2019/0026462 A1    1/2019   Berg et al.
2020/0380309 A1*  12/2020   Weider .................... G06F 9/44

OTHER PUBLICATIONS

Barreno et al., "The security of machine learning," March Learn (2010) 81: 121-148. DOI: 10.1007/s10994-010-5188-5.
Huang et al., "Adversarial Machine Learning," AISec' 11, Oct. 2011, 15 pages, ACM.
Becker, E., "Microsoft's AI Bot, Tay, demostrates the scary (and racist) future of artificial intelligence," ProTech, printed Apr. 1, 2019, 10 pages. https://protechitjobs.com/microsofts-ai-bot-tay-demonstrates-the-scary-and-racist-future-of-artificial-intelligence/.

* cited by examiner

DETECTING AND PREVENTING UNWANTED MODEL TRAINING DATA

BACKGROUND

The present disclosure relates to data acquisition, and more specifically, to a method and a system for securely acquiring datasets for model training to prevent unwanted model behavior.

Supervised machine learning requires labeled datasets in order to train a model. However, data is typically acquired as unlabeled data. By annotating examples comprising the unlabeled dataset, the unlabeled data can become a labeled dataset. Annotating can be accomplished through various means. For example, annotation can occur automatically from payload data, from specialized annotation companies, and from individuals contracted over the internet. However, the resulting labeled dataset may not be sufficiently accurate to properly train a machine learning model. This can be due to, at least in part, incorrectly labeled datasets resulting in unwanted behavior from the model.

SUMMARY

Various embodiments are directed to a method of evaluating a labeled dataset to prevent unwanted behavior in a model. The method includes acquiring a new dataset for integration with an existing dataset, wherein the existing dataset is used to train a machine learning model. The method also includes calculating a baseline of variation for the existing dataset. The baseline of variation can be determined by evaluating various characteristics of the existing dataset. The method further includes determining an output value for the new dataset by also evaluating characteristics of the new dataset. The method also includes comparing the output value to the baseline of variation to generate a variance between the output value and the baseline of variation. The method can further include determining whether the variance is within an acceptable range of the baseline of variation.

Further embodiments are directed to a computer program product for evaluating a labeled dataset to prevent unwanted model behavior. The computer program product includes instructions to cause a system to acquire a new dataset for integration with an existing dataset. The existing dataset being used to train a machine learning model. The instructions further cause the system to calculate a baseline of variation for the existing dataset. The baseline of variation can be determined by evaluating various characteristics of the existing dataset. The instructions also cause the system to determine an output value for the new dataset by also evaluating characteristics of the new dataset. The instructions also cause the system to compare the output value to the baseline of variation to generate a variance between the output value and the baseline of variation. The instructions further cause the system to determine whether the variance is within an acceptable range of the baseline of variation.

Additional embodiments are directed to a system, to evaluate datasets and prevent unwanted model behavior, including at least one processing component and at least one memory component. The system also includes a machine learning model, a data pre-processor, a model tester, a fairness analyzer, a distributed ledger, a new dataset, and an existing dataset. The memory component can also include program instructions which cause the system to acquire a new dataset for integration with an existing dataset, wherein the existing dataset is used to train a machine learning model. The instructions can further cause the system to calculate a baseline of variation for the existing dataset. The baseline of variation can be determined by evaluating various characteristics of the existing dataset. The instructions can also cause the system to determine an output value for the new dataset by also evaluating characteristics of the new dataset. The instructions can also cause the system to compare the output value to the baseline of variation to generate a variance between the output value and the baseline of variation. The instructions can further cause the system to determine whether the variance is within an acceptable range of the baseline of variation.

BRIEF DESCRIPTION OF THE DRAWINGS

These and other features, aspects, and advantages of the embodiments of the disclosure will become better understood with regard to the following description, appended claims, and accompanying drawings where:

Figure 1:
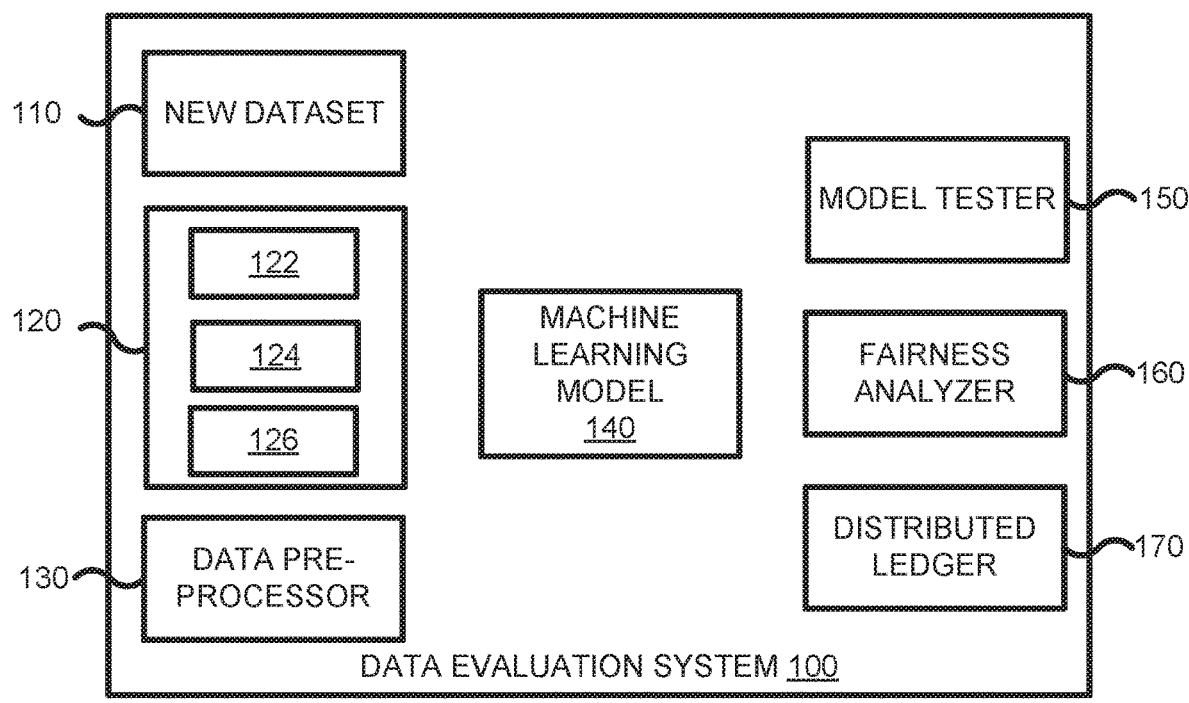
FIG. 1 is a block diagram illustrating a computing system for implementing a data evaluation system, according to embodiments of the present disclosure.

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numeral are used to designate like parts in the accompanying drawings.

DETAILED DESCRIPTION

Cognitive computing can be described by technology platforms that simulate the human cognition process to find solutions to complex problems. These cognitive computing platforms can encompass fields of technology such as machine learning, natural language processing, speech recognition, objection recognition, as well as other various types of technologies. With the advent of cognitive computing, many issues present in human behavior are also present in the world of artificial intelligence. For instance, indoctrination is the process of teaching a person with ideas, attitudes, cognitive strategies, or professional methodologies, and to accept those beliefs uncritically. This type of behavior, in regard to cognitive computing, is most akin to machine learning. In machine learning, models can be trained to perform unwanted behavior either intentionally, or unintentionally, based on the dataset they are trained on. For example, misclassification or erroneous data due to human error can result in unwanted model behavior by a model trained with that erroneous data. Malicious data injections of altered data content can also result in unwanted and unintended behavior by the model.

An unintended or unwanted behavior of a model can also be difficult to detect if it is unknown that the model was trained with incorrect or malicious data. Given the vulnerability of a machine learning model during the training stage, embodiments of the disclosure detect and prevent the introduction of unwanted data into these models during the training cycle.

The annotation process can be crucial in ensuring that a properly labeled dataset correctly trains a model to behave in accordance with its task. Depending on the resources available, organizations, or individuals, can rely on various sources to perform the annotation process. For example, annotations can be performed by undergraduate or graduate students, crowdsourcing services, or directly from user inputs, otherwise known as payload data. However, these sources can provide incorrect or biased labeled data if that data is not inspected and pre-processed correctly.

Students or colleagues performing annotations may introduce biases that can go undetected due to, at least in part, the similarities, background, and closeness that the student or colleague may have to the requestor. To prevent such biases, crowd sourcing services utilize a variety of people across a network, such as the internet. While there are a variety of platforms available, these platforms may not sufficiently screen potential scammers attempting to inject malicious annotations into a dataset during the labeling process. Payload data can also be susceptible to biases and malicious data injections, and if introduced directly into a model, can result in noisy and unintended behaviors by the model.

Disclosed herein are a method and a system for evaluating data to prevent and detect unwanted behavior in a machine learning model. The method can include acquiring a new dataset for integration with an existing dataset. The existing dataset being used to train a machine learning model. The method can also include calculating a baseline of variation for the existing dataset. The baseline of variation can be determined by evaluating various characteristics of the existing dataset. The method can further include determining an output value for the new dataset by also evaluating characteristics of the new dataset. The method can also include comparing the output value to the baseline of variation to generate a variance between the output value and the baseline of variation. The method can further include determining whether the variance is within an acceptable range of the baseline of variation.

FIG. 1 is a block diagram illustrating a data evaluation system 100, for evaluating datasets and preventing unwanted model behavior, according to embodiments of the present disclosure. The data evaluation system 100 includes a new dataset 110, an existing dataset 120, a data pre-processor 130, a machine learning model 140, a model tester 150, a fairness analyzer 160, and a distributed ledger 170. In some embodiments, the data evaluation system 100 is included within or embodied by a computer system, described below.

The new dataset 110 is a set of data evaluated by the data evaluation system 100 to determine whether to integrate the new dataset 110 into a training cycle. The new dataset includes a collection of examples. Each example contains one or more features and a label. For example, the new dataset 110 may include a collection of photograph examples. Each of the examples may include a label that indicates whether a vehicle is present within the photograph or not. "Features" are input variables of an example that are used to make a prediction on a label. Features can be weighed and adjusted by a model to assist in making an accurate prediction on a label.

The existing dataset 120 is a set of data used by the data evaluation system 100 as training data for the machine learning model 140. The existing dataset 120 includes a collection of examples with each example containing one or more features and a label. In some embodiments, the existing dataset 120 is divided into a training dataset 122, a validation dataset 124, and a test dataset 126. The validation dataset can be a subset of the existing dataset 120 for use in validating a pseudo labeled dataset. The test dataset 126 is a subset of the existing dataset 120 used to test the machine learning model 140 after training and validation. The existing dataset 120 can also randomize selecting the training dataset 122, validation dataset 124, and the test dataset 126 selections to prevent overfitting by the machine learning model 140.

The data pre-processor 130 is a component of the data evaluation system 100 configured to preprocess the new dataset 110. The data pre-processor 130 is further configured to perform data analytics on the new dataset 110 and the existing dataset 120 to determine the variances between the datasets. The data pre-processor 130 can also transform raw data into a usable format. Transformation can include cleaning raw data of missing values, smoothing noisy data, and resolving inconsistencies. The transformation can also include data integration, transformation, reduction, and discretization. The data pre-processor 130 can also perform a sentiment analysis and a toxicity analysis on the data. The sentiment analysis measures an overall attitude a dataset may have toward a service, product, organization, or topic. For example, a sentiment analysis can be conducted on feedback from a restaurant survey to determine the degree to which customers generally liked or disliked their food order. The toxicity analysis measures whether annotations of a dataset are toxic or a healthy contribution to the machine learning model 140.

The machine learning model 140 is a component of the data evaluation system 100 configured to learn from training data and assign labels to unlabeled datasets once trained. The machine learning model 140 is further configured to adjust parameters and weights of features during the training cycle. The machine learning model 140 can perform predictive analyses, spam detection, pattern detection, image classification, other types of categorical classifications, as well as logistic regressions. The machine learning model 140 can employ different algorithmic methods to map and label the inputted data. For example, the machine learning model 140 may be a perceptron, a Naïve Bayes, a decision tree, a logistic regression, a k-nearest neighbor, a neural network, a support vector machine, or any other type of algorithm capable of classification.

The machine learning model 140 is further configured to provide a logistic regression type model. This model type can generate a prediction probability for each label predicted. For example, if the machine learning model 140 predicts an email as spam, that prediction is accompanied with a prediction probability, or confidence level, the machine learning model 140 has in providing that prediction. The prediction probability can be a percentage ranging from 0 to 100% depending on the confidence of the machine learning model 140. It should be noted that other forms of prediction probability can also show the confidence level of a predicted label. As the machine learning model 140 is trained, its prediction probabilities can also increase.

The model tester 150 is a component of the data evaluation system 100 configured to test the machine learning model 140 for unwanted behaviors. The model tester 150 can perform analytics to determine whether a presented behavior is typically a behavior of low probability. In some embodiments, the model tester 150 is configured to perform a probability density function, such as a Gumbel distribution, on the machine learning model 140 to determine whether the presented behaviors are of low probability or otherwise atypical for the model.

The fairness analyzer 160 is a component of the data evaluation system 100 configured to test the fairness of the machine learning model 140. "Fairness" as described herein, can be a measure of bias present in predictions performed by the machine learning model 140. Types of bias such as stereotyping and prejudice toward things, people, or groups can affect collection and interpretation of data. Forms of this type of bias can include automation bias, confirmation bias, group attribution bias, and implicit bias. Other types of bias can include biases such as a systematic error introduced by a sampling procedure or reporting procedure. Forms of this type of bias can include coverage bias, participation bias, and sampling bias.

The distributed ledger 170 is a component of the data evaluation system 100 configured to prevent alterations to the new dataset 110 without a consensus agreement. The distributed ledger can require a consensus between participants before modifying a dataset. In some embodiments, the distributed ledger is spread across several nodes, or devices, over a network. The distributed ledger can maintain a dataset where labels must be agreed upon prior to an example of the dataset being labeled. In some embodiments, the distributed ledger is a HYPERLEDGER® (a trademarked product of The Linux Foundation).

Figure 2:
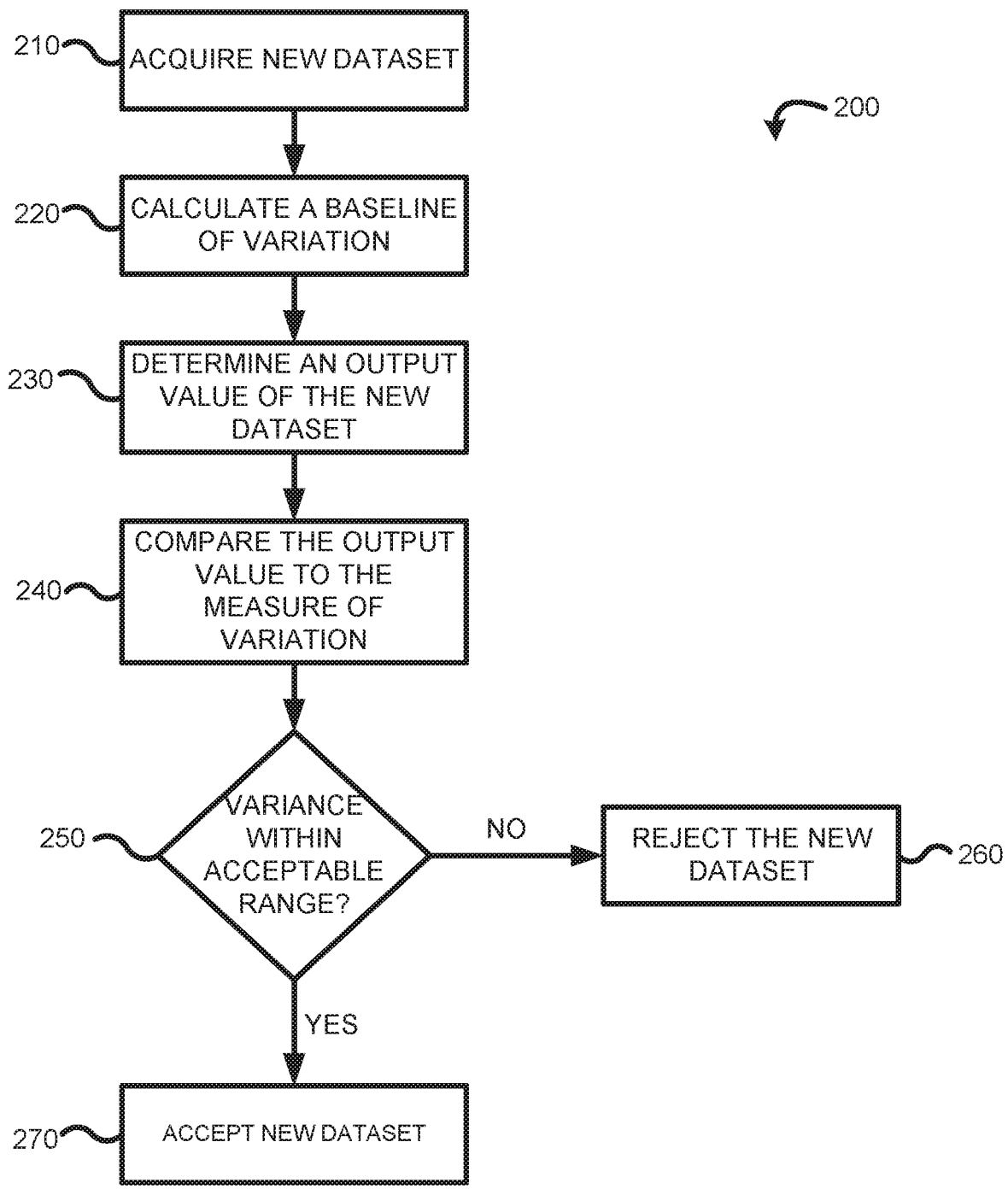
FIG. 2 is a flow diagram illustrating a process of evaluating a dataset to prevent unwanted model behavior, according to embodiments of the present disclosure.

FIG. 2 is a flow diagram illustrating a process 200 of evaluating a new dataset, according to embodiments of the present disclosure. A new dataset 110 is acquired by the data evaluation system 100. This is illustrated at step 210. The new dataset 110 can be acquired through various ways. For example, the new dataset 110 can be acquired from a third-party vendor, from publicly available datasets over the internet, or directly from users. The new dataset 110 can also be acquired through a combination of various sources until a desired dataset size is achieved.

A baseline of variation is calculated on the existing dataset 120. This is illustrated at step 220. The baseline of variation can be used to describe the distribution of example behavior within the existing dataset 120. In some embodiments, the data pre-processor 130 generates a normal distribution of the existing dataset 120 in which the mean of that distribution is used as the baseline of variation. Various data analytic tools can be used to analyze the distribution of data within the existing dataset 120. For example, the mean of a sentiment and/or toxicity analysis performed on the existing dataset 120 can be used as a basis for the baseline of variation. Once calculated, the baseline of variation can be used to identify how much of a variance there is between the existing dataset 120 and the new dataset 110. The variance can be analyzed to determine whether the new dataset 110 can be added to the existing dataset 120 without introducing behaviors of low probability.

An output value of the new dataset 110 is determined by the data pre-processor 130. This is illustrated at step 230. The output value can be a value based on the analytics performed to determine the baseline of variation. For example, if the mean of a sentiment analysis was used as the baseline of variation, then a sentiment analysis is also conducted on the new dataset 110 to determine the output value of that analysis. The data analytic tool chosen to determine the distribution between the existing dataset 120 and the new dataset 120 is used to determine the baseline of variation and the output value such that the output value can then be compared to the baseline of variation to determine the variance in the values.

The output value of the new dataset 110 is compared to the baseline of variation of the existing dataset 110. This is illustrated at step 240. The distribution of the output value compared to the baseline of variation can be measured to determine whether the output value is within an acceptable range of the baseline of variation. In some embodiments, the data pre-processor 130 compares the baseline of variation by calculating the standard deviation of the existing dataset 120. The standard deviation can be used to quantify the amount of variation or dispersion for a set of data values. Other distribution factors, such as mean, skewness, and kurtosis can also be used to compare the output value and the base line of variation.

A determination is made as to whether the variance between the output value and the baseline of variation is within an acceptable range. This is illustrated at step 250. The extent of the variance the output value is to the baseline of variation can be used to as a way to decide whether to accept or reject the new dataset 110. In some embodiments, the variance is measured by how many standard deviations the output value is compared to the baseline of variation. For example, if the output value is of significant difference, or two standard deviations away from the mean, then the new dataset 110 is rejected and not integrated into the existing dataset 120. This is illustrated at step 260. A variance within the average, or less than one standard deviation, can be accepted by the data evaluation system 100 and integrated into the existing dataset 120. This is illustrated at step 270. In some embodiments, a variance of moderate difference, or one standard deviation away from the mean, is further evaluated to determine whether the data will lead to a heightened significant difference or not. The determination as to how to handle variances of moderate difference can be changed by policy as an administrator sees fit.

Figure 3:
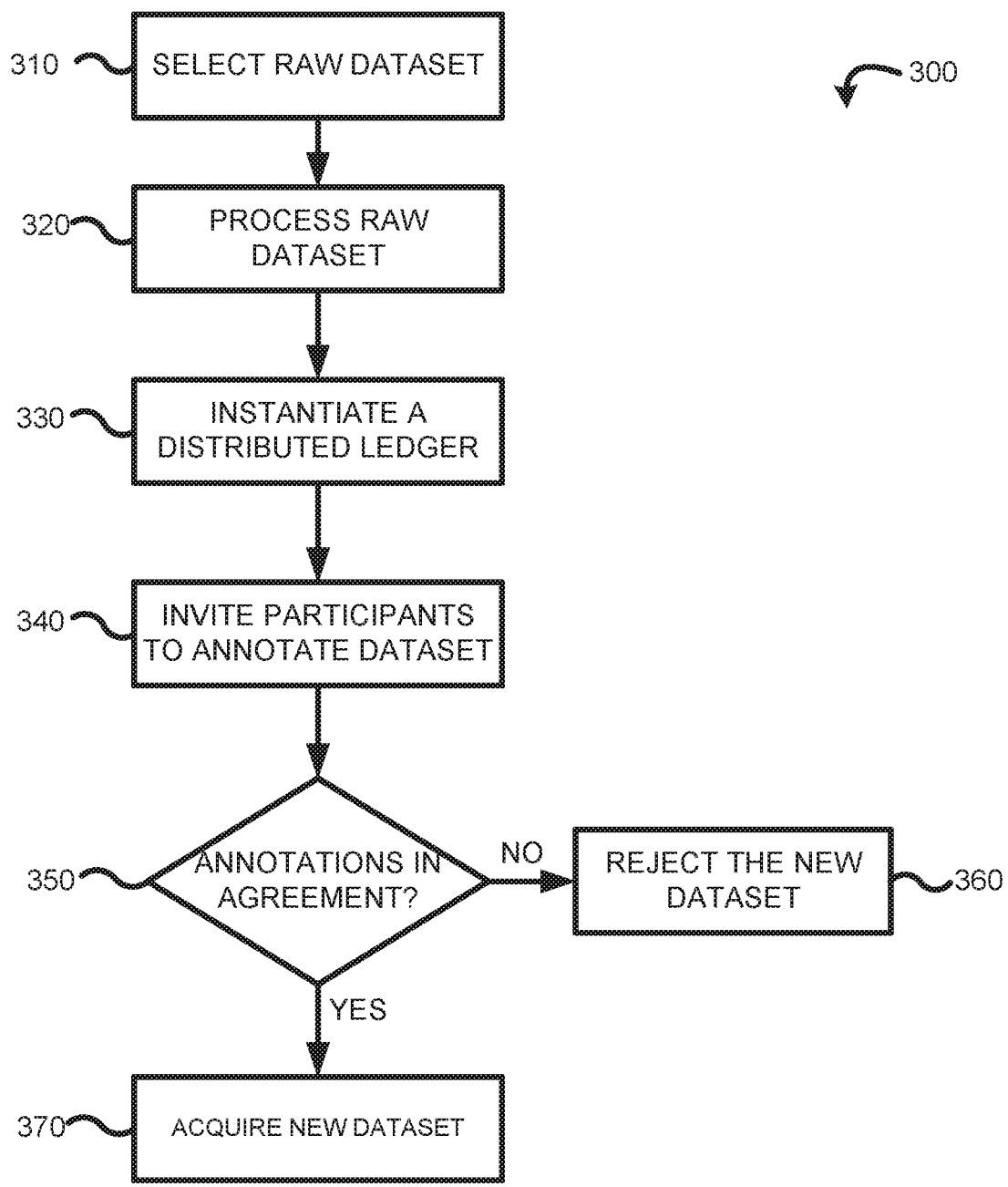
FIG. 3 is a flow diagram illustrating a process of acquiring a dataset by implementing a distributed ledger, according to embodiments of the present disclosure.

FIG. 3 is a flow diagram illustrating a process 300 of acquiring a new dataset, according to embodiments of the present disclosure. In some embodiments, the process 300 comprises or incorporates one or more steps of the process 200. For example, the operations of process 300 may comprise all, part, or sub-operations of step 210 of process 200.

A raw dataset is selected based on a problem the machine learning model 140 is tasked with resolving. This is illustrated at step 310. Enterprise organizations, or individuals, typically select raw datasets that enhance the scope and predictability of their prediction system. A raw dataset can be obtained through content providers, or vendors, that specialize in providing data for a particular domain of interest. The raw dataset can be provided as structured or unstructured data. For example, structured data can be data organized in a table, such as a spreadsheet. Unstructured data is data that does not follow any standardized organization hierarchy. This can be video files, photographs, text files, as well as many other forms of data. However, a raw dataset is data that has not been processed for use on a machine learning model.

The raw dataset is processed and analyzed for errors. This is illustrated at step 320. Raw datasets can be processed, or preprocessed, in several different ways. For example, multiple characteristics can be applied to text data that can transform that data into a structured format. A few of these characteristics can be, word or phrase count, special character count, relative length of text, type of topics, and character count. However, other forms of processes occur, such as correcting inconsistent data, replacing missing data, and removing noisy data.

The raw dataset can also go through a series of preprocessing procedures such as data cleaning, integration, transformation, reduction, and discretization. In data cleaning, the raw dataset is adjusted through processes such as filling in missing values, smoothing noisy data, and resolving inconsistencies within the data. Integration can involve resolving conflicts between data points with different representations. Transformation can involve a process of normalizing, aggregating, and generalizing the raw dataset. Reduction can reduce the amount of data to consolidate the representation of the raw dataset. Discretization can involve reducing number values of continuous attributes. Once processed, the raw dataset is transformed in a processed dataset ready for annotation.

A distributed ledger is instantiated to require a consensus on annotations applied to the processed dataset. This is illustrated at step 330. A distributed ledger is a database that can exist across several locations or among multiple participants. Records, or annotations, can only be accepted when there is a consensus among participants performing the annotation process. Once a consensus has been determined, all participants are updated with the same updated ledger. Cryptographic keys and signatures can also be used to ensure that security is accomplished and in place. In some embodiments, a HYPERLEDGER Fabric is used as the distributed ledger. The HYPERLEDGER Fabric can provide additional features such as role delineation and configurable consensus agreements.

Participants are invited to annotate the processed dataset through the distributed ledger. This is illustrated at step 340. Each participant can perform the annotation process of labeling the processed dataset. Once a participant has completed their annotations for the processed dataset, they can then submit those annotations to the distributed ledger. In some embodiments, annotations are weighed based on the participant performing the annotation. For example, a participant of known reliance and quality work can be given a greater weight to their annotations. A participant that has not been frequently used, or possibly unreliable, can be given a lesser weight to their annotation. This can help ensure that the correct annotation is provided for the examples in the processed dataset.

Once each participant provides annotations for the processed dataset, the annotations are analyzed to determine whether they are in agreement. This is illustrated at step 350. If, there is not a consensus among the participants regarding the annotations of the processed dataset, the processed dataset is rejected. This is illustrated at step 360. However, if the annotations are in agreement and there is a consensus on the labeling of the examples within the processed dataset, the processed dataset can be accepted and acquired. This is illustrated at step 370.

In some embodiments, the processed dataset is parsed into examples where there is a consensus agreement on the annotation and examples where there is not a consensus agreement on the annotation. The parsed examples with consensus agreement can then be combined into a new dataset and acquired. The parsed examples without a consensus agreement can either be reannotated by the participants or discarded.

Figure 4:
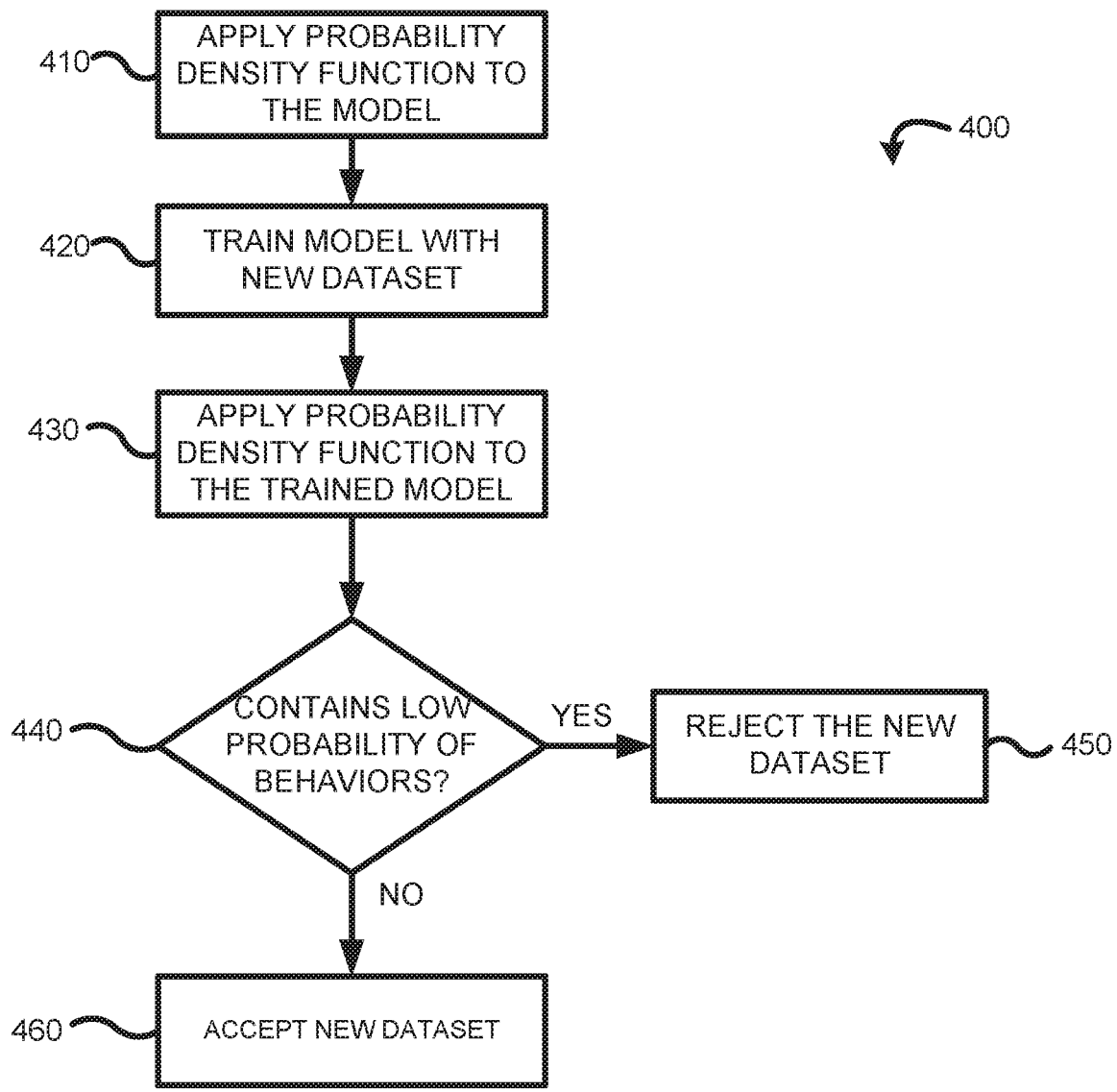
FIG. 4 is a flow diagram illustrating a process of evaluating a model for unwanted behavior, according to embodiments of the present disclosure.

FIG. 4 is a flow diagram illustrating a process 400 of evaluating a model for unwanted behavior, according to embodiments of the present disclosure. The model tester 150 applies a probability density function to the machine learning model 140. This is illustrated at step 410. The probability density function can be configured to provide the probability of a given behavior of the machine learning model 140. For example, if a low probability of occurrence is indicated by several behaviors from the machine learning model 140, it can be determined that the behavior of the machine learning model 140 has fundamentally changed.

In some embodiments, a Gumbel distribution function is applied to the machine learning model 140. The Gumbel distribution function can be used to model the distribution of the maximum probability of behaviors provided by the machine learning model 140. The Gumbel distribution function can plot the probabilities of the behaviors and, when provided with additional behaviors, can indicate whether the additional behaviors are of normal or exponential type. However, other distribution functions can be applied to the model 140.

The machine learning model 140 is trained with the new dataset 110. This is illustrated at step 420. In order to determine whether the machine learning model 140 behaves differently with the new dataset 110, it must first be trained with the new data. Training can occur through supervised learning techniques. The machine learning model 140 may use a variety of algorithms during the training cycle. For example, support vector machines, linear regression, logistic regression, decision trees, as well as various other algorithms may be used.

During the training cycle, the new dataset 120 can be parsed into training sets, test sets, and validation sets. These parsed sets can be used to manage the characteristics of the model. For example, the sets can be adjusted to manage the variances within the model predictions as well as any bias that may be present. The parsed sets can also manage the degree of noise present in the output values produced by the machine learning model 140.

In some embodiments, the machine learning model is evaluated for fairness by the fairness analyzer 160. Fairness can be determined by policies, codes of conduct, laws, and orders put in place by organization, corporations, or by some other entity. Fairness can measure the level of bias the machine learning model 140 has when making a prediction. For example, confirmation bias, anchoring bias, and selection bias are a few biases that can be evaluated by the fairness analyzer 160.

Once the fairness is evaluated by the fairness analyzer 160, the machine learning model 140 can incur a penalty to mitigate the level of bias present in the prediction. In some embodiments, the penalty is a regularization term. The regularization term can be a measure of model complexity. By basing the regularization term around the fairness of the model, a penalty can be implemented in such a way as to reduce the level of bias.

Once the machine learning model 140 is trained with the new dataset 110, the model tester 150 reapplies the probability density function to the machine learning model 140. This is illustrated at step 430. The same function applied to the machine learning model 140 prior to it being trained by the new dataset 110 is used again to allow for a comparison to determine whether the model after training displays behavior of low probability at a higher frequency.

Once the distribution of behaviors is determined, a comparison between the distribution of behavior present in the machine learning model 140 prior to being trained with the new dataset 110 and the distribution of behavior present in the machine learning model 140 subsequent to being trained by the new training dataset 110. This is illustrated at step 440. If the machine learning model 140 presents a higher frequency of behaviors of low probability, then the new dataset 110 is rejected. This is illustrated at step 450. However, if the machine learning model presents behaviors consistent with behaviors presented prior to being trained by the new dataset 110, then the new dataset 110 is accepted.

Figure 5:
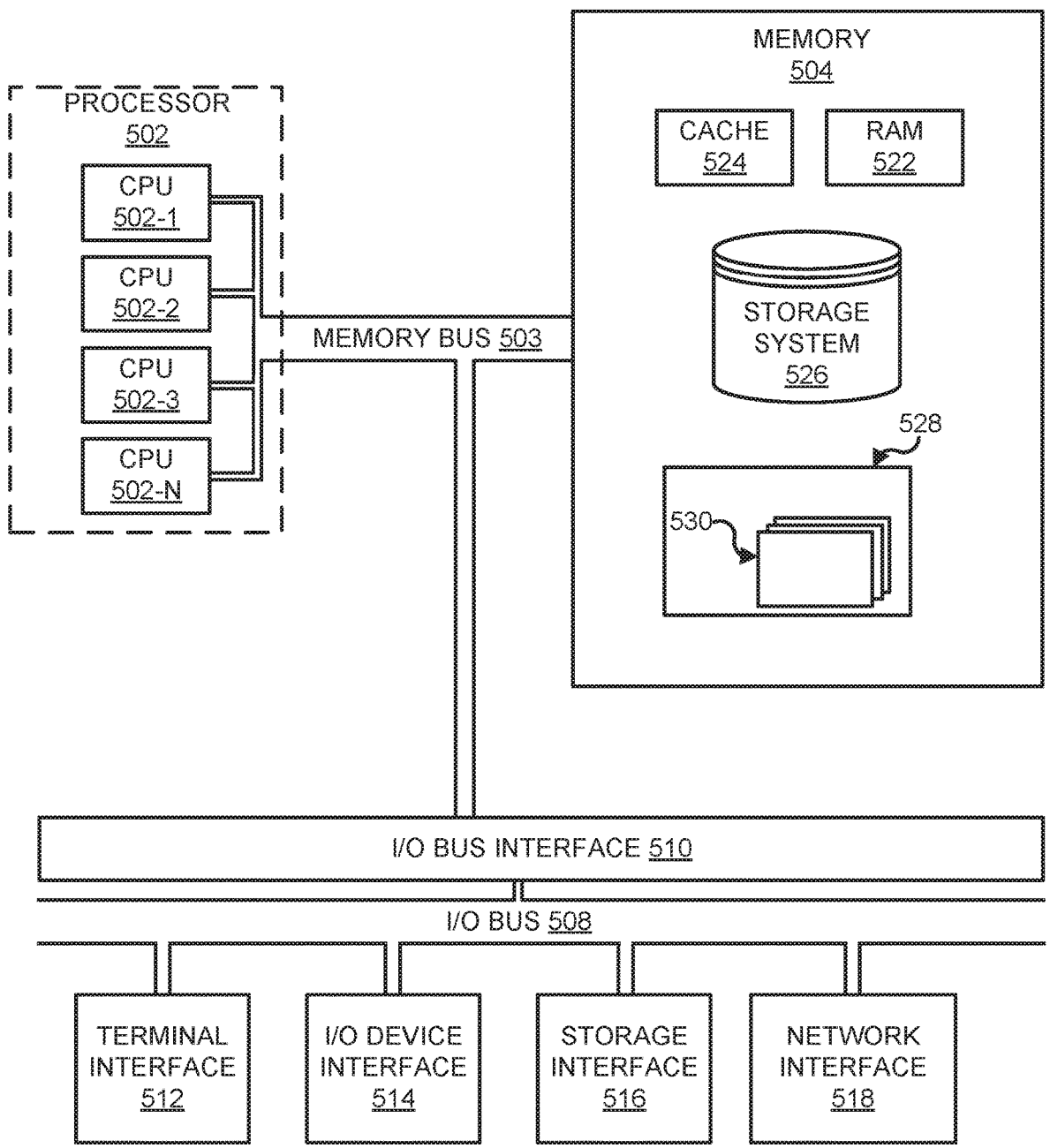
FIG. 5 is a high-level block diagram illustrating an example computer system that may be used in implementing one or more of the methods, tools, and modules, and any related functions, described herein, according to embodiments of the present disclosure.

Referring now to FIG. 5, shown is a high-level block diagram of an example computer system 500 (e.g., data evaluation system 100) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 500 may comprise one or more processors 502, a memory 504, a terminal interface 512, a I/O (Input/Output) device interface 514, a storage interface 516, and a network interface 518, all of which may be communicatively coupled, directly or indirectly, for inter-component communication via a memory bus 503, a I/O bus 508, and an I/O bus interface 510.

The computer system 500 may contain one or more general-purpose programmable central processing units (CPUs) 502-1, 502-2, 502-3, and 502-N, herein generically referred to as the processor 502. In some embodiments, the computer system 500 may contain multiple processors typical of a relatively large system; however, in other embodiments the computer system 500 may alternatively be a single CPU system. Each processor 502 may execute instructions stored in the memory 504 and may include one or more levels of on-board cache. In some embodiments, the processor 502 executes the processes included herein (e.g., process 200, 230).

The memory 504 may include computer system readable media in the form of volatile memory, such as random-access memory (RAM) 522 or cache memory 524. Computer system 500 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

Although the memory bus 503 is shown in FIG. 5 as a single bus structure providing a direct communication path among the processors 502, the memory 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 500 may, in some embodiments, contain multiple I/O bus interface units, multiple I/O buses, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 500 may be a multi-user mainframe computer system, a single-user system, or a server computer or similar device that has little or no direct user interface but receives requests from other computer systems (clients). Further, in some embodiments, the computer system 500 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 500. In some embodiments, however, individual components may have greater or lesser complexity than as represented in FIG. 5, components other than or in addition to those shown in FIG. 5 may be present, and the number, type, and configuration of such components may vary.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a data pre-processor configured to perform data analytics on a new dataset and compare the data analytics from the new dataset with analytics from an existing dataset;
    a machine learning model configured to be trained from the existing dataset;
    a model tester configured to test behaviors performed by the machine learning model, and to compare a set of behaviors performed by the machine learning model prior to being trained with the new dataset with the set of behaviors performed by the machine learning model subsequent to being trained with the new dataset; and
    a fairness analyzer configured to test predictions made by the machine learning model for biases and measure the biases in the test predictions, wherein the biases include automation bias detectable in the test predictions.

2. The system of claim 1, wherein the new dataset is integrated into the existing dataset upon a determination by the data pre-processor that a variance between the new dataset and the existing dataset is within an acceptable difference.

3. The system of claim 1, wherein the data analytics performed on the new dataset and the existing dataset is a sentiment and toxicity analysis.

4. The system of claim 1, wherein the new dataset is annotated by participants utilizing a distributed ledger, wherein the distributed ledger requires the participants to be in agreement on annotations for the new dataset.

5. The system of claim 1, wherein the model tester applies a probability density function to test the behaviors of the machine learning model.

6. A method comprising: acquiring a new dataset for integration with an existing dataset, wherein the existing dataset is used to train a model; calculating a baseline of variation for the existing dataset by evaluating characteristics of the existing dataset; determining an output value by evaluating characteristics of the new dataset; comparing the output value to the baseline of variation to generate a variance of the output value to the baseline of variation; determining whetherthe variance is within an acceptable range of the baseline of variation; transforming, upon determining that the variance is within the acceptable range of the baseline of variation, the existing dataset by adding the new dataset to the existing dataset.

7. The method of claim 6, further comprising:
rejecting the new dataset, upon determining that the variance is not within the acceptable range of the baseline of variation.

8. The method of claim 6, wherein the baseline of variation is calculated by determining a standard deviation for the existing dataset and the output value is calculated by determining a deviation from the standard deviation for the existing dataset.

9. The method of claim 6, wherein the baseline of variation is a mean of sentiment and toxicity levels generated by a sentiment and toxicity analysis of the existing dataset, and wherein the output value is a new sentiment and toxicity level generated by the sentiment and toxicity analysis.

10. The method of claim 6, wherein receiving the new dataset comprises:
receiving a raw dataset;
preprocessing the raw dataset into a processed dataset;
instantiating a distributed ledger to manage the processed dataset;
inviting annotators to individually generate annotations for the processed dataset; and
accepting the processed dataset as the new dataset upon determining that the annotations are in agreement with each other.

11. The method of claim 6, further comprising:
applying a probability density function to the model to generate a first generalized distribution of behaviors;
training the model with the new dataset;
applying the probability density function to the model to generate a second generalized distribution of behaviors; and
rejecting the new dataset upon determining that the second generalized distribution contains behaviors of low probability compared to the first generalized distribution.

12. The method of claim 6, further comprising:
training the model with a test dataset parsed from the new dataset;
measuring the model for a fairness level, wherein the fairness level is based on a policy; and
applying a penalty to the model based on the fairness level, wherein the penalty is incurred to the model through a regularization term.

13. A computer program product for dataset evaluation, the computer program product comprising a computer readable storage medium having program instruction embodied therewith, the program instructions executable by a processor to cause the processor to:
acquire a new dataset for integration with an existing dataset, wherein the existing dataset is used to train a model;
calculate a baseline of variation for the existing dataset by evaluating characteristics of the existing dataset;
determine an output value by evaluating characteristics of the new dataset;
compare the output value to the baseline of variation to generate a variance of the output value to the baseline of variation;
determine whether the variance is within an acceptable range of the baseline of variation; and
transforming, upon determining that the variance is within the acceptable range of the baseline of variation, the existing dataset by adding the new dataset to the existing dataset.

14. The computer program product of claim 13, further comprising instructions to cause the processor to:
reject the new dataset, upon determining that the variance is not within the acceptable range of the baseline of variation.

15. The computer program product of claim 13, wherein the baseline of variation is calculated by determining a standard deviation for the existing dataset and the output value is calculated by determining a deviation from the standard deviation for the existing dataset.

16. The computer program product of claim 13, wherein the instructions to receive the new dataset comprise additional instructions to cause the processor to:
receive a raw dataset;
process the raw dataset into a processed dataset;
instantiate a distributed ledger to manage the processed dataset;
invite annotators to individually generate annotations for the processed dataset; and
accept the processed dataset as the new dataset upon determining that the annotations are in agreement with each other.

17. The computer program product of claim 13, further comprising the instructions to cause the processor to:
apply a probability density function to the model to generate a first generalized distribution of behaviors;
train the model with the new dataset;
apply the probability density function to the model to generate a second generalized distribution of behaviors; and
reject the new dataset upon determining that the second generalized distribution contains behaviors of low probability compared to the first generalized distribution.

18. The computer program product of claim 13, further comprising the instructions to cause the processor to:
train the model with a test dataset parsed from the new dataset;
measure the model for a fairness level, wherein the fairness level is based on a policy; and apply a penalty to the model based on the fairness level, wherein the penalty is incurred to the model through a regularization term.

\* \* \* \* \*